US005766469A

United States Patent [19]
Boast et al.

[11] Patent Number: 5,766,469
[45] Date of Patent: Jun. 16, 1998

[54] ORIFICE FILTER

[75] Inventors: Andrew J. Boast, Fontana, Wis.; William B. Hoff, Rockford, Ill.

[73] Assignee: Filtertek, Inc., Hebron, Ill.

[21] Appl. No.: 734,522

[22] Filed: Oct. 18, 1996

[51] Int. Cl.⁶ ............................................. B01D 35/02
[52] U.S. Cl. ........................ 210/335; 210/446; 210/495; 137/550
[58] Field of Search ............................ 210/171, 335, 210/339, 418, 445, 446, 449, 455, 483, 484, 490, 495; 55/482, 483, 491, 511; 138/41; 184/52

[56] References Cited

U.S. PATENT DOCUMENTS

| | | |
|---|---|---|
| 1,558,626 | 10/1925 | Pignal . |
| 2,334,802 | 11/1943 | Zuckerman . |
| 3,109,459 | 11/1963 | Lee et al. . |
| 3,523,408 | 8/1970 | Rosenberg ........................ 55/159 |
| 3,715,870 | 2/1973 | Guzick . |
| 4,113,627 | 9/1978 | Leason . |
| 4,512,771 | 4/1985 | Norton ........................ 55/482 |
| 4,571,244 | 2/1986 | Knighton . |
| 4,608,166 | 8/1986 | Cain . |
| 4,749,481 | 6/1988 | Wheatley . |
| 4,826,598 | 5/1989 | Cain . |
| 4,828,694 | 5/1989 | Leason . |
| 4,944,876 | 7/1990 | Miller . |
| 5,049,274 | 9/1991 | Leason et al. . |
| 5,076,933 | 12/1991 | Glenn et al. . |
| 5,137,624 | 8/1992 | Klotz . |
| 5,139,685 | 8/1992 | de Castro et al. . |
| 5,314,616 | 5/1994 | Smith . |

OTHER PUBLICATIONS

Orifice Filter Part Nos. 60040 and 54241, Author and date unknown.

*Primary Examiner*—Matthew O. Savage
*Attorney, Agent, or Firm*—Brinks Hofer Gilson & Lione

[57] ABSTRACT

An orifice filter suitable for placement in, among other environments, a motor vehicle transmission assemblage, includes a plastic body member with an orifice and filtration material overlying both orifice outlets, all received within a metal housing. A plastic overmold is provided outboard of the filtration material. The filter allows for bidirectional flow of fluid through the assembly, provides for a means of bleeding pressure between fluid volumes in an assemblage, and maintains the secure positioning of the orifice in the assemblage over a range of ambient and operating temperatures. Further, a method of forming a filter assembly, including coining the metal housing of the filter assembly, allows for providing proper dimensional tolerances of the housing axial length and/or housing flange.

27 Claims, 3 Drawing Sheets

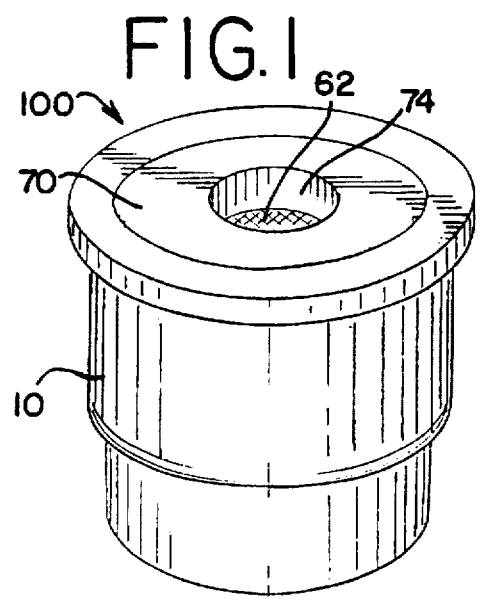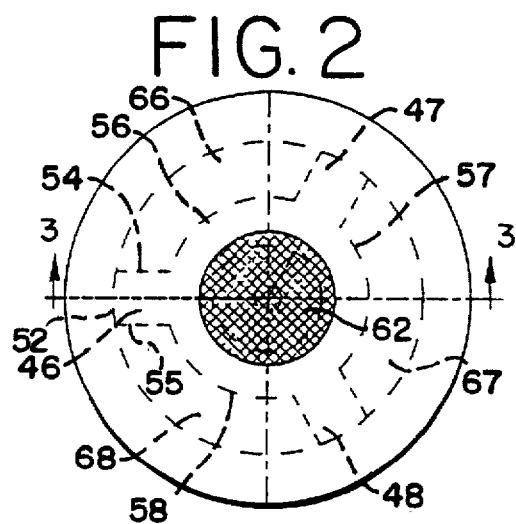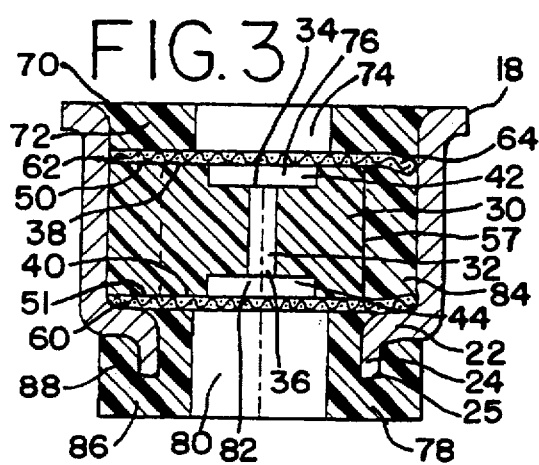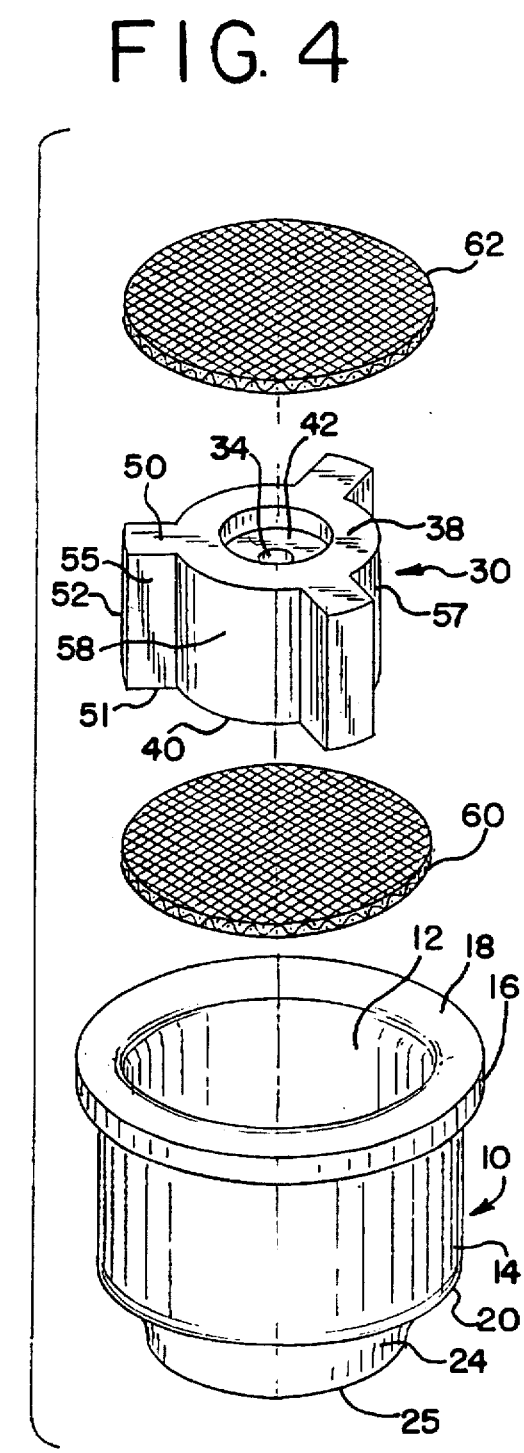

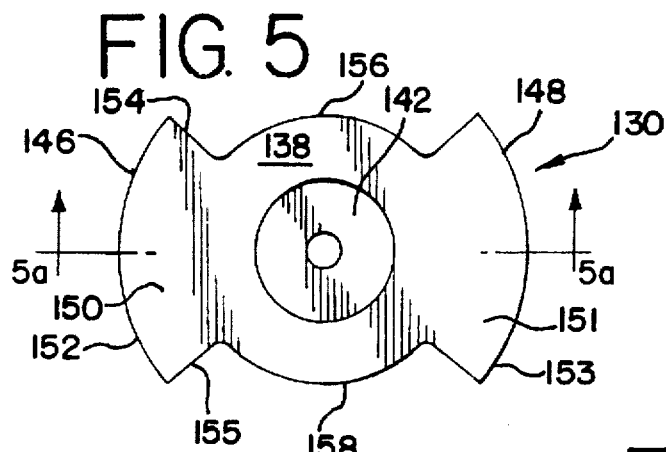
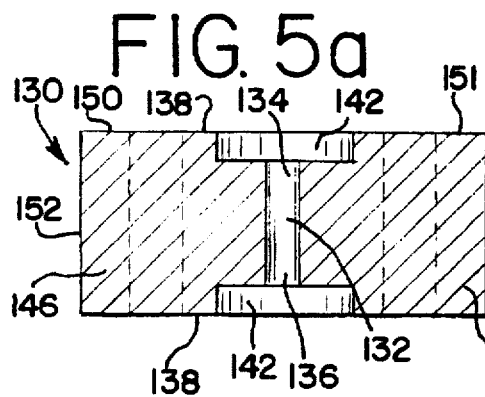
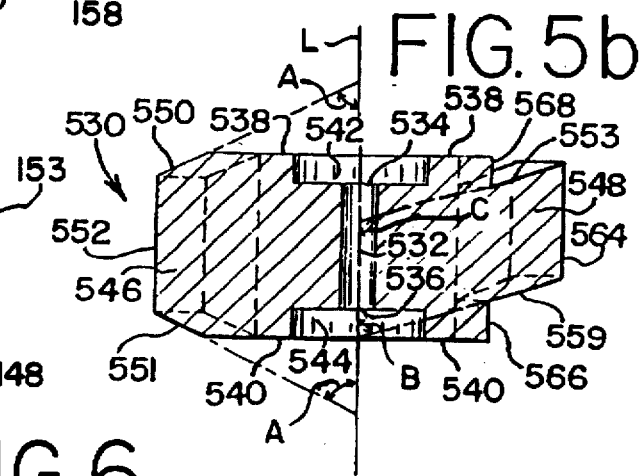
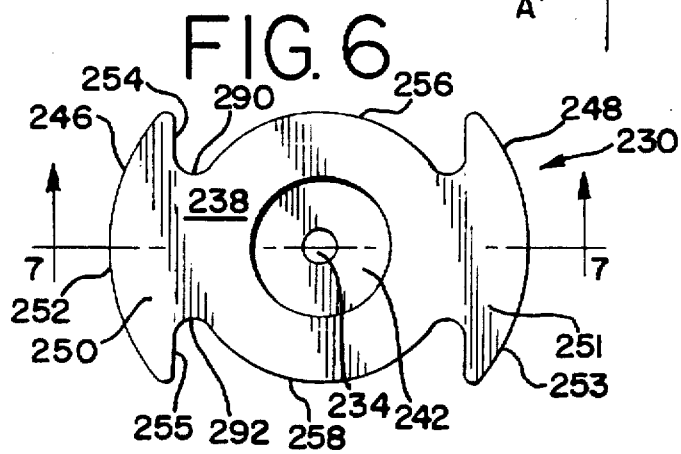
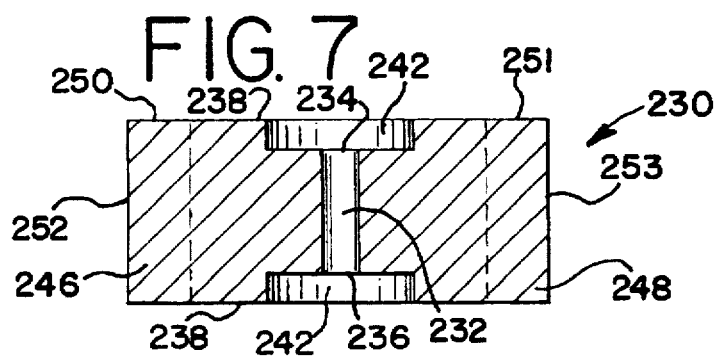

ORIFICE FILTER

BACKGROUND OF THE INVENTION

This invention relates to orifice filters for fluids, such as fluids in an actuating device in an automatic transmission for motor vehicles, as well as methods of making such filters.

Often it is desirable to place a ball check valve into a motor vehicle transmission or pump assembly to release the buildup of pressure within the assembly. Such an assembly in a transmission includes frictional units that couple rotatable members to one or more planetary gear set members, and typically include one or more fluid actuating devices such as a piston in order to engage and disengage the frictional units. Consequently, fluid actuating devices are provided, some of which include an orifice with a ball check valve, to allow fluid to pass therethrough due to differential pressures. Such a ball check valve may consist of a steel ball, spring, and washer retained inside an aluminum housing by a mechanical stake at the open end. To allow for bidirectional fluid flow between fluid sources, there is occasionally a pair of ball check valves placed in opposing directions between fluid sources.

In place of a ball valve or set of ball valves positioned to allow for bidirectional flow, an orifice filter can be placed in a suitable location between fluid sources in the assembly. The orifice in the filter can be designed at the appropriate diameter to bleed off the pressure as it begins to build within the assembly. Orifice diameters in the range of 0.015 to 0.020 inches (0.38 to 0.51 mm) or smaller must be protected from debris generated within the transmission or associated pump. Accordingly, filter screens secured over pockets on each side of the orifice have been incorporated into orifice filters that collect particles that would otherwise block the orifice. Such bidirectional orifice filters use as the securing member a plastic overmold that circumferentially overlies filter disks that in turn abut the orifice body member. This overmold also has a cylindrical exterior surface that engages an appropriately sized bore in the assembly.

One disadvantage with the above described orifice filter is that over time, due to the high temperature oil environment to which it is exposed, the plastic overmold that engages the bore in the assembly is subject to creep. This creep results in shrinkage and consequent lessened frictional force between the filter and assembly bore and possible consequent displacement of the filter during use. Further, but to a lesser degree due to proper tolerancing of the corresponding bore, this orifice filter may expand and contract at a differing rate than the assembly into which it is inserted due to differing coefficients of thermal expansion, and accordingly possibly become displaced. As a result, a need exists for providing an orifice filter that is not only bidirectional to allow fluid to pass therethrough, but also securely incorporates a housing that can better maintain a proper fit throughout the temperature changes experienced in harsh environments, such as that of an automatic transmission assembly over normal operating temperatures and normal ambient temperatures. Further, there is a need to incorporate metal housings in plastic assemblages, such as a filter assembly, in a cost-effective manner that allows for closely controlling the housing exterior dimensions to assure proper initial fitment into another assembly.

SUMMARY OF THE INVENTION

A unique orifice filter has been developed which makes it possible to properly fit into assemblies such as those subject to harsh environments. One aspect of the invention is a filter that includes a generally cylindrical metal housing having a first and second end, a plastic body member having an axis and received within said housing, the body member having an orifice extending through the body member and first and second outlets, filtration material overlying the first and second outlets, and a plastic overmold extending into the interior of the housing and having a first flow channel therethrough outboard of the filtration material overlying the first orifice outlet and a second flow channel therethrough outboard of the filtration material overlying the second orifice outlet.

Another aspect of the present invention is that it also encompasses a method for producing a plastic assembly from a stamped metal housing having an axis and initially provided with an outward flange, which includes the steps of aligning first and second plastic injection mold halves for relative movement along a path, with the first mold half having a bore adapted to receive the stamped metal housing and further having an inner wall perpendicular to the path and defining a recess adjacent the bore and an interior bending surface between the inner wall and the portion of the first mold half having a bore, and the second mold half having a bearing surface substantially perpendicular to the path; inserting the stamped metal housing into the first mold half bore with the outward flange of the housing partially engaging the interior bending surface of the first mold half; moving the first and second mold halves relative to each other along the path to engage the outward housing flange with the second mold half bearing surface to produce a coined region in the housing outward flange adjacent the interior bending surface of the first mold half; engaging the first and second mold halves to form a cavity and then injecting a plastic resin into the cavity to form a plastic assemblage; cooling the first and second mold halves; moving the first and second mold halves relative to each other along the path to separate the assemblage from one of the mold halves; and ejecting the assemblage.

With the novel combination of this invention, a bidirectional orifice filter assembly is provided. An advantage of the present invention is that the filter assembly is self-cleaning due to the bidirectional fluid flow, does not require a mechanical stake as do ball valves, and allows for bleed off of pressure between fluid sources. The metal housing of the present invention is not as subject to the creep effect from high temperatures, such as that present in the automatic transmission environment, and thus should be less prone to displacement from the fitment bore over time. In the preferred embodiment, the orifice filter may be secured into an automatic transmission assembly fitment bore so that this assembly maintains a secure fit throughout the temperatures experienced in automatic transmissions, both ambient as well as operating temperatures. Another advantage of the present invention is that the filter assembly is provided with an overmold such that the plastic and metal assemblage is less prone to separating over time in this operating environment. Further, in one preferred embodiment, a plastic overmold captures a flange of the metal housing which further prevents the metal and plastic assemblage components from separating over time. Yet another advantage of a preferred embodiment of the present invention is close control of some dimensions for an economical to fabricate filter assembly which otherwise may be problematic for subsequent fitment of the filter into assemblies. Indeed, in one aspect of the present invention, there is the advantage of providing a finished plastic assemblage that utilizes a metal housing with close dimensional tolerances that would otherwise not be as economical to fabricate.

3

Other features and advantages of the present invention will become more fully apparent from the following description of the preferred embodiments, the appended claims and the accompanying drawings.

BRIEF DESCRIPTION OF THE DRAWINGS

FIG. 1 is a perspective view of an embodiment of the orifice filter of the present invention.

FIG. 2 is a plan view of the orifice filter of FIG. 1.

FIG. 3 is a sectional view taken along line 3—3 of FIG. 2.

FIG. 4 is an exploded perspective view showing most of the components of the orifice filter of FIG. 1.

FIG. 5 is a plan view of an alternative design for a plastic body member defining an orifice.

Figure 5a is a sectional view taken along line 5a—5a of FIG. 5.

FIG. 5b is a sectional view of a second alternative design for a plastic body member defining an orifice.

FIG. 6 is a plan view of a third alternative and presently preferred plastic body member defining an orifice.

FIG. 7 is a sectional view taken along line 7—7 of FIG. 6.

DETAILED DESCRIPTION OF THE DRAWINGS AND PREFERRED EMBODIMENTS OF THE INVENTION

Figure 8:
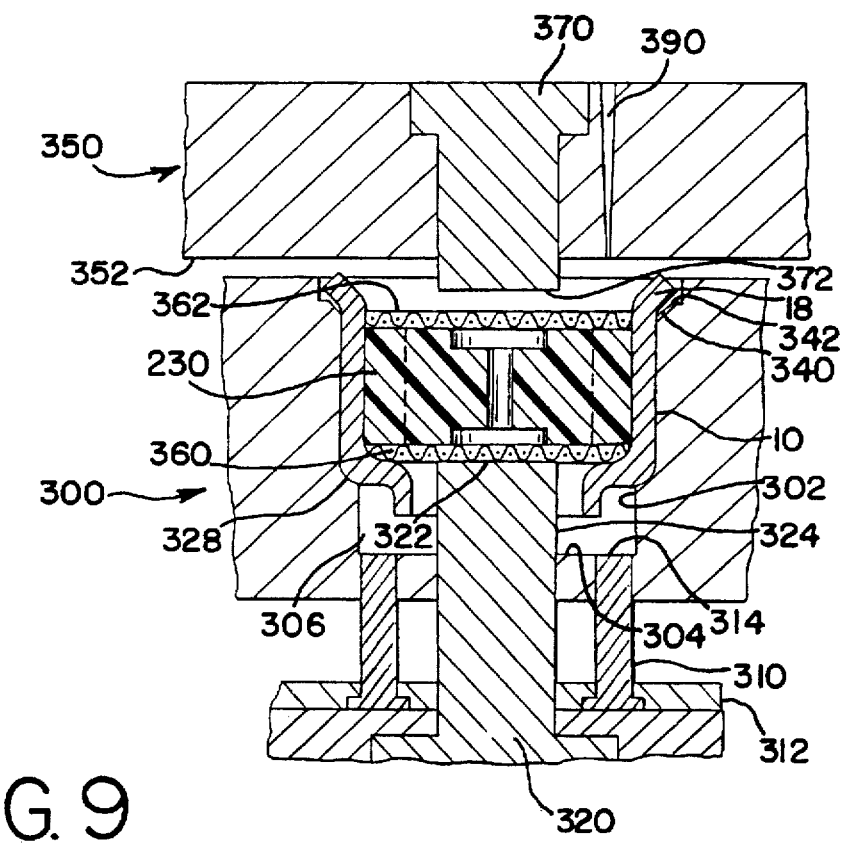
FIG. 8 is a fragmentary sectional view of tooling utilized for forming the filter assembly of FIG. 1 that includes the plastic body member of FIGS. 6 and 7.

One embodiment of an orifice filter assembly 100 suitable for placement into an automatic transmission of a motor vehicle is shown in FIGS. 1–4. The orifice filter is comprised of a generally cylindrical metal housing 10 that receives a generally cylindrical body member 30 and filtration material 60, 62. The body member 30 is secured and maintained in the metal housing 10 by an overmold element 70 which holds the filtration material 62, 60 in the orifice filter assembly 100. Orifice 32 through body member 30 (best shown in FIG. 3) allows fluid to pass through filtration material 60, 62 via first orifice outlet 34 and second orifice outlet 36 and thereby filter fluid and provide pressure bleed off characteristics for suitable applications, such as certain locations in an automatic transmission assembly.

Body member 30 has first end 38 and second end 40, preferably planar in configuration to allow filtration material 62, 60, respectively, to abut against cylindrical body member 30 when assembled. Ends 38, 40 further define first cavity 42 and second cavity 44, which communicate with first orifice outlet 34 and second orifice outlet 36, respectively. Body member 30 is further provided with a plurality of positioning ribs 46, 47, 48 which, in this embodiment, have identical geometry. Specifically, in this embodiment, first and second lateral walls 50, 51 are coplanar with first and second body member ends 38, 40, respectively. Positioning rib 46 further has longitudinal circumferential wall 52 which, in this embodiment, is adapted to engage interior wall 12 of housing 10. Positioning rib 46 further has longitudinal radial walls 54, 55 that in this embodiment are generally parallel. Between positioning ribs 46, 47, 48 are circumferential walls 56, 57, 58 of body member 30.

As shown in FIG. 3, body member 30 and positioning ribs 46, 47, 48 are shaped so that body member 30 is received within housing 10. In this embodiment, longitudinal circumferential walls 52 of positioning ribs 46, 47, 48 abut interior wall 12 of housing 10. When body member 30 is combined with filtration material 60, 62 and housing 10, cavities 66, 67, 68 are thereby formed.

Housing 10, as shown in FIGS. 3 and 4, is of generally cylindrical configuration with an interior cylindrical wall 12 and an exterior cylindrical wall 14. First end 16 of housing 10 has an outward flange 18. Further, in the preferred embodiment, housing 10 has a second end 20 with an inward flange 22 and axial flange 24.

As can be seen from FIG. 3, the filtration material 60, 62 is molded into an orifice filter assembly 100 via plastic overmold shown generally as 70. The above enumerated components are held in place while the plastic overmold 70 is formed using a molding technique more fully set forth below. As shown in FIG. 3, the overmold 70 is generally comprised of first overmold section 72 that secures filtration material 62 and defines first flow channel 74. Inboard of first flow channel 74 is first fluid pocket 76 defined by filtration material 62 and first end cavity 42. Thus first orifice outlet 34 is in fluid communication with first flow channel 74 via first fluid pocket 76 and filtration material 62. Similarly, second overmold section 78 secures filtration material 60 and defines second flow channel 80, which is in fluid communication with second orifice outlet 36 via filtration material 60 and second fluid pocket 82 defined by filtration material 60 and second end cavity 44. Accordingly, second orifice outlet 36 is in fluid communication with second flow channel 80 via second fluid pocket 82 and filtration material 60.

In this embodiment the overmold generally shown as 70 further has connecting leg 84 between first overmold section 72 and second overmold section 78. The connecting leg 84 is located in the cavity 67 between positioning ribs 47, 48. During the overmolding operation, it is believed the overmold plastic of the connecting leg 84 will pass through filtration material 62 and bend filtration material 62 at leg 64 in reaction to mold pressure and gate location for the overmold plastic material, as shown in FIG. 3 and as further set forth below.

As shown in FIGS. 3 and 4, housing second end 20 with inward flange 22 and axial flange 24 permit second overmold section 78 to encapsulate axial flange 24 via radial overmold leg 86 and axial overmold leg 88. Overmold legs 86, 88 may thereby hold housing 10 in place, as well as the full assembly of this embodiment, over a range of operating conditions.

With the completed assembly as shown in FIGS. 1, 2, and 3, assembly 100 may function as a bidirectional filter once it is fitted into an appropriate bore in an assembly, and also provide the necessary pressure release characteristic between fluid sources in which assembly 100 is interposed. Fluid enters through flow channels 74, 80, is filtered by filtration material 62, 60, further flows via fluid pockets 76, 82, and the pressure bleeding function is performed via orifice 32 and respective orifice outlets 34, 36.

Although the above disclosed embodiment for a body member includes three positioning ribs 46, 47, and 48, ribs fewer or greater in number and of various shapes may be used. Similarly, although ribs with lateral ends coplanar with the body member ends have been disclosed, other geometries that include portions forming acute or obtuse angles with the member's axis may be employed.

For example, and with reference to FIGS. 5 and 5a, a first alternative body member is shown. Body member 130 is similar in configuration to body member 30 in having two planar ends to allow filtration material to abut against each end when assembled into a filter. Each member end 138 is identical and provided with cavity 142 which communicates with a respective orifice outlet 136. Body member 130 is further provided with two positioning ribs 146, 148 which are arranged and configured to give member 130 bilateral symmetry. Although lateral walls 150, 151 of ribs 146, 148, respectively, are coplanar with end 138 in this embodiment, it can be appreciated that the lateral walls may not necessarily be. Positioning rib 146 further has circumferential wall 152 which is adapted to engage the interior wall of a suitably configured housing, such as housing 10 (see FIGS. 1 to 4). Still further, rib 146 has radial longitudinal walls 154, 155. Between ribs 146 and 148 are circumferential walls 156, 158.

By further example, and with reference to FIG. 5b, a second alternative body member 530 is shown in cross-section. This alternative is similar to the above first alternative body member in exterior configuration, with two positioning ribs providing the embodiment with a plan view like that of FIG. 5. Similarly, first end 538 and second end 540 are planar and have a generally circular perimeter as viewed in plan view, with a diameter as that established in the first alternative body member by circumferential walls 156, 158. Ends 538, 540 have first cavity 542 and second cavity 544, respectively, which communicate with first orifice outlet 534 and second orifice outlet 536, respectively. Body member 530 is further provided with two positioning ribs 546, 548. In this embodiment, however, the ribs are not coplanar. Specifically, for first positioning rib 546, the first lateral wall 550 and second lateral wall 551 are inclined at approximately a 25° angle from the plane established by the respective planar end. Thus, first positioning rib 546 lateral walls 550, 551 each make an acute interior angle A to the body member axis L as referenced from the respective end 538, 540(which, in this embodiment, is about 65°). Also, positioning rib 546 has a longitudinal circumferential wall 552 which, in this embodiment, is adapted to engage the corresponding interior wall of a housing into which the body member is placed. As to second positioning rib 548, the first lateral wall 553 is axially offset from the first end 538 by a longitudinal wall 568 and rises at an approximate 15° angle as measured from the plane established by the first end 538. Similarly the second lateral wall 559 of positioning rib 548 is axially offset from the second end 540 by longitudinal wall 566 and, in this embodiment, rises parallel to the first lateral wall 553. Both first and second lateral walls 553, 559 terminate at a longitudinal circumferential wall 564, which, in this embodiment, is adapted to engage a housing interior wall. Thus, the second positioning rib 548 has a second lateral wall 559 that makes an acute interior angle B to the body member axis as referenced from its respective second end 540 (which, in the embodiment is about 75°), and a first lateral wall 553 that makes an obtuse interior angle C to the member axis as referenced from its respective first end 538 (which, in this embodiment is about 105°). This embodiment further has longitudinal radial walls, and circumferential walls between the positioning ribs, of such geometry to render a plan view perimeter like that of FIG. 5.

Further, and with reference to FIGS. 6 and 7, a third alternative and presently preferred plastic body member embodiment is disclosed. As is readily noted from these figures, many of the features of body member 230 are similar to the features of body member 30 (see FIGS. 1–4)and body member 130 (see FIGS. 5, 5a), and accordingly these similar features have been denoted by numerical designations incremented by 200 with respect to body member 30 and by 100 with respect to body member 130. Of further note with respect to this embodiment is that adjoining radial longitudinal walls 254, 255 with circumferential walls 256, 258 are, respectively, arcuate longitudinal wall portions 290, 292.

The orifice filter is generally formed by conventional molding practices and insert molding techniques, with the following additional notable steps. The plastic body member that defines the appropriately sized orifice is separately molded using conventional injection molding techniques. The metal housing, in the preferred embodiment, is separately stamped using conventional metal stamping techniques and has an outward flange several degrees from perpendicular to the cylindrical outer wall (e.g. 92degrees). Further, although the axial length of the housing is controlled to some degree in the metal stamping operation, the tolerance for the axial length of the housing measured from inward flange exterior to outward flange exterior is substantially more than 0.0002 inches due to inherent variations in the typical stamping process. This variation is unacceptable for some applications of an orifice filter, such as an application in an automatic transmission. In the preferred embodiment of the method of the present invention, this variation is eliminated in a novel combined coining and overmold operation.

The assembly process can begin with placement of a first filtration material disk 360 into the housing 10 using a conventional punch operation. Then the body member 230 is inserted. Thereafter a second filtration material disk 362 is punched into the housing over the body member, again using a conventional punch operation. The housing 10 is then loaded into a suitably configured plastic injection first mold half 300, as shown in fragmented crosssection in FIG. 8, which is a simplified mold drawing for purposes of illustrating an embodiment of the invention. First mold half 300 includes bottom core 320 that has a planar surface 322 for contacting the filtration material. First mold half 300 is further provided with a plurality of ejector pins shown schematically as 310 that, together with appropriate connecting plates shown generally schematically as 312, eject a completed filter assembly from mold half 300. Bottom core 320 has circumferential surface 324 that, in combination with mold half side wall 302 and bottom wall 304, and ejector pin surfaces 314, forms annular cavity 306 into which the housing 10 extends. First mold half 300 further has inner annular shoulder portion 328 upon which the housing 10 may not initially fully engage when loaded.

Figure 9:
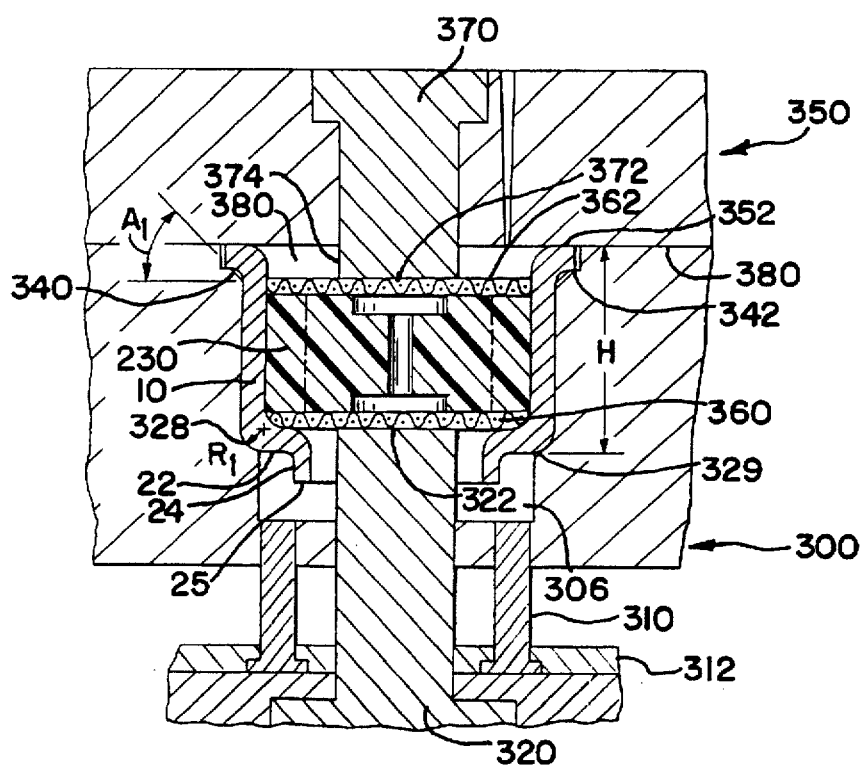
FIG. 9 is a fragmentary sectional view of the tooling of FIG. 8 immediately before injection of plastic resin.

Following loading first mold half 300, a second plastic injection mold half 350, which includes top core 370 that has a generally planar surface 372, and a plastic injection gate 390, among conventional features, is pressed toward first mold half 300. Upon complete closure of second mold half 350 with first mold half 300 along parting line 380 (see FIG. 9), top core planar surface 372 contacts its respective filtration material, as does bottom core planar surface 322 contact its respective filtration material. The operation of mold closure, as shown in the process of occurring in FIG. 8 and completed in FIG. 9, results in the coining of the outward flange 18 to be more perpendicular to the housing axis, via contact of outward flange 18 with first mold half annular planar surface 342, annular bending surface 340, and second mold half bearing surface 352. The coining operation may also provide a cold flow of housing material that results in a well toleranced axial length for the housing 10 due to the engagement of the housing 10 between inner annular shoulder 328 of first mold half 300 and planar surface 352 of second mold half 350.

Following closure of the mold halves (see FIG. 9), and consequent coining of the housing or portions thereof, plastic material for an overmold is introduced via gate 390. This overmold plastic flows into an annular cavity 380 adjacent the coined housing outward flange 18, second mold half planar wall 352, and circumferential wall 374 of top core 370. Further, due to the substantial pressure of the injected resin, it is believed the plastic flows into one or more cavities adjacent body member 330 and inboard of filtration material 362 through this material and/or around a portion of this material that may flex downwardly (see e.g., FIG. 3, leg 64). The plastic forming the overmold continues to progress in the cavity toward the other end of housing 10, it is believed flowing through filtration material 360 and/or around portions of this material to flow to annular cavity 306, and thus surround the other end of housing 10. After a period of time has elapsed for plastic injection, the mold halves are cooled (via typical chilled water channels not shown), the mold halves are separated via parting line 380 and the finished part is ejected via typical ejection pins 310.

The coining operation in the plastic injection mold provides several advantageous features for the assembly. First, the coining of the housing outward flange 18 to be more perpendicular to the housing axis assures substantial engagement between outward flange 18 and second mold half planar surface 352, which may prevent subsequent flashing of overmold plastic resin during the overmold resin injection cycle. Also, the coining of outward flange 18 may assure the subsequent proper fitment with the transmission or other well-toleranced assembly bore, which also may have a counter bore to accommodate the outward flange. Further, this operation provides close tolerance for the axial length of the housing, and consequently the filter, to within 0.0002 inches (0.005 mm) which corresponds to the close tolerancing of the subject tooling, and thus may assure proper subsequent fitment into an assembly bore, such as a transmission. Such close tolerances from a conventional stamping operation alone would be quality control intensive and thus as a practical matter cost prohibitive.

In the preferred embodiment of the mold half tooling, the first mold half annular bending surface 340 is planar and has angle A, (see FIG. 9) of 45°, the inner annular shoulder portion 328 has a radius R, of 0.0197 inches (0.500 mm), and distance H, from parting line 380 to inner annular shoulder terminus 329, of 0.1725 inches (about 4.38 mm). Of course, the above preferred dimensions are dependent in part on the housing material composition, thickness, and diameter. Similarly, the bending surface could be of a given radius rather than planar, depending upon the housing material properties.

In the preferred embodiment of the orifice filter, housing 10 is a cold rolled, tin coated steel stamping of approximately 0.020 inches (0.50 mm) wall thickness. Prior to coining by the mold halves, the housing axial length measured from inward flange exterior (that which engages annular shoulder terminus 329) to outward flange exterior (that which initially engages the second mold half planar surface 352) is between about 0.177 to 0.175 inches (4.45 to 4.50 mm). Thus, the housing axial length, using the above reference points for measurement, may be coined 0.003 to 0.005 inches (0.07 to 0.12 mm) using the above preferred tooling. Further, due to the inherently well toleranced tooling, final dimensions for this axial length may become tightly controlled, to as low as 0.0002 inches (0.005 mm).

The preferred plastic body member is configured as in FIGS. 6 and 7, and composed of nylon 6—6, 33% glass filled, heat stabilized. The body member dimensions include an axial length of 2.50 to 2.55 mm (0.098 to 0.100 inch), first end cavity and second end cavity diameter of about 2.0 mm (0.079 inch) and depth of about 0.40 mm (0.016 inch), exterior circumferential wall diameter (from positioning rib to other positioning rib) of 5.70 to 5.75 mm (0.224 to 0.226 inch) and circumferential walls adjoining the ribs of approximately 3.75 mm (0.148 inch) in diameter. Maximum rib width between radial longitudinal rib walls is also approximately 3.75 mm (0.148 inch), and the orifice is molded into the body member with final diameter dimension of about 0.015 to 0.020 inches (preferably 0.48 to 0.53 mm). Filtration material may be, for example, polyester screen rated to retain 50 micron and larger particles. Further, the overmold shown generally as 70, is preferably nylon 6—6 33% glass filled, heat stabilized. The above noted plastic materials are illustrative and many other suitable materials well known in the art can be used. For example, the overmold plastic may be nylon 6-12 or a polyester suitable for the fluid and operating temperature of the assembly. Similarly other filtration materials, such as nylon, steel, brass, or stainless steel screen may be used depending on the intended application.

Although the filter assembly steps leading to and following after the coining and molding operations can be manually conducted, it is presently preferred to use an automated assembly line to obtain economies of scale and operation speed. The stamped metal housings are ejected from a conventional stamping machine into a vibratory feeder bowl that discharges stampings to a vacuum conveyor, oriented such that they are in a diameter to diameter orientation with flanges oriented in similar position, and not overlapping when discharged. The vacuum conveyor confines the stamping flanges to maintain their orientation and is provided with holes for the vacuum applied to the belt to be drawn through the stampings so that subsequently punched filtration material and deposited body members are held into the stampings. The conveyor transfers the stampings to ground sprockets that locate the stampings at the loading operation stations.

The first loading station automatically feeds filtration material from a stock reel, and punches a disc into the stamping located directly beneath the die plate. A second station automatically feeds body members by way of a vibratory bowl that confirms orifice presence and passes the members to a vibratory inline conveyor that in turn passes them to a locating nest, which in turn drives a correctly located member into a stamping (already loaded with a filtration material disc) directly below the nest. The stamping is advanced to a third loading station, identical to the first loading station, which punches and loads filtration material to overlay the body member. Following loading, the subassembled stampings are conveyed to a mechanism that groups them and spaces each group on correct centers for loading into the first mold half. A suitable pick and place mechanism is used to seat a group of subassemblies into the mold half. Following the injection molding operation, another suitable pick and place mechanism removes the mold runners, and a separate such mechanism then grips the completed filters and places them onto an outfeed conveyor that transfers them away from the molding area.

It can be appreciated that although one orifice filter embodiment shows coaxial orifice 18, cavities, 42, 44, body member 30, filtration material 60, 62, and housing 10, as well as flow channels 74, 80, and fluid pockets 76, 82 (see FIGS. 1–4), this coaxial geometry is not required. The orifice itself may be created by conventional molding techniques or by laser or other microholing techniques to obtain diameters of 0.1 mm (0.004 inch). Additionally, although in the embodiments shown the overmold is an integral plastic member, non-integral first and second overmold sections with appropriate housing geometries can readily be used. Further, the necessity for cavity 42, 44 or fluid pockets 76, 82, may vary with anticipated loose debris size and fluid flow characteristics, and thus such features may be optional.

The plastic body member may comprise positioning ribs of various geometries. Variations to that disclosed include a rib with a lateral wall that begins from one planar end and another lateral wall offset from the other end, with both making a general obtuse angle to the body member axis, or such a rib with lateral walls that begins from the respective body member ends (and thus has no axially offsetting longitudinal wall adjacent the rib). Similarly, there may be a rib with lateral walls that make acute angles to the body member axis and be axially offset from one end by a longitudinal wall, or such a rib that may be axially offset from each end. Of course, a body member itself may have different rib configurations, e.g. a rib with acute angled lateral walls axially offset and another rib with its obtuse angled lateral walls not axially offset. Conversely, positioning ribs may not be required in some molding operations, and thus the body member and housing may be so configured to provide a single cavity for the overmold to flow into during molding.

The generally cylindrical housing may be of any appropriate metal and need not be stamped, and may be aluminum machined by lathe or other such mechanical means. However, it has been determined that a steel stamped housing is most economical. Further, although housing second end 20 need not include axial flange 24 attached to inward flange 22 (see FIGS. 1–4), it is preferred due to the inherent creation of a circumferential bur at the terminus of the second end during stamping. Axial flange 24 with flange end bur 25 thus assures a smooth interior surface of housing 10 via inward flange 22, which thus makes it less likely that the filter integrity will be jeopardized during assembly. Similarly, although inward flange 22 and outward flange 18 are disclosed as continuous, they may be discontinuous such as comprising peripheral stakes or the like. Moreover, although radial overmold leg 86 and axial overmold leg 88 are disclosed as circumferentially continuous, they also may be discontinuous such as comprising a series of circumferential J-shaped overmold sections.

The disclosed and claimed orifice filter assembly has numerous advantages. The disclosed assembly is of simple construction, yet provides a secure orifice filter that provides a desired pressure bleeding characteristic. The disclosed assembly may be maintained securely over a range of both ambient and operating temperatures in environments to which it is suited, for example, motor vehicle automatic transmissions. The assembly provides no moving parts, such as an opposed ball valve arrangement, and further eliminates a mechanical stake in the assembly. Further, the disclosed assembly is economical to produce yet provides a low tolerance in dimensions of axial height and/or outward flange geometry that are important for proper fitment into the bore and counterbore for which such filters are designed to be inserted.

While the preferred embodiments of the aspects of this invention have been disclosed, it is to be understood that the invention is not limited to the disclosed examples or their disclosed use. For example, in addition to use of this filter in transmissions and transmission hydraulic pumps, other applications may involve fuel pumps, vehicle axles, and the like. Modifications of design in addition to those discussed can be made without parting from the invention. The scope of the invention is indicated in the appended claims and all changes that come within the meaning and range of equivalency of the claims are therefore intended to be embraced therein. Thus, while the invention has been described with reference to particular embodiments, modification of structure, materials and the like will be apparent to those skilled in the art, yet still fall within the scope of the invention.

What is claimed is:

1. A filter assembly for filtering contaminants comprising:
   a) a generally cylindrical metal housing having a first base end, second base end, and a generally hollow interior,
   b) a plastic body member having an axis and received within said housing interior, said body member having an orifice with first and second outlets in fluid communication therewith and said orifice extending through said body member,
   c) filtration material with said body member therebetween, said filtration material thereby overlying and in fluid communication with respective the first and second orifice outlets, and
   d) a plastic overmold extending into the interior of said housing and having an outboard first flow channel therethrough directing fluid from outside the filter assembly to fluidly communicate with said filtration material overlying the first orifice outlet and an outboard second flow channel therethrough directing fluid from outside the filter assembly to fluidly communicate with said filtration material overlying the second orifice outlet.

2. The filter assembly of claim 1 wherein the body member and housing cooperate to provide a cavity therebetween and the overmold substantially fills the cavity.

3. The filter assembly of claim 2 wherein the body member includes planar first and second ends generally perpendicular to the body member axis.

4. The filter assembly of claim 3 wherein the body member first and second ends have respective first and second end cavities opening outwardly from respective ends, the first and second end cavities being in fluid communication with the respective first and second orifice outlets, and wherein the filtration material abuts the first and second body member ends, thereby forming first and second fluid pockets from the respective first and second body member end cavities, said first and second pockets in fluid communication with the orifice.

5. The filter assembly of claim 2 wherein the body member includes first and second ends and at least two positioning ribs with at least one positioning rib having a lateral wall generally defining a plane, the rib lateral wall plane being oriented at an acute angle to the axis of the body member, as measured interiorly from the body member axis toward the rib lateral wall plane.

6. The filter assembly of claim 5 wherein the body member first and second ends have respective first and second cavities opening outwardly from the respective ends, the first and second cavities being in fluid communication with the respective first and second orifice outlets, and wherein the filtration material abuts the first and second body member ends, thereby forming first and second fluid pockets from the respective first and second body member end cavities, said first and second pockets in fluid communication with the orifice.

7. The filter assembly of claim 2 wherein the body member includes first and second ends and at least two positioning ribs with at least one positioning rib having a lateral wall generally defining a plane, the rib lateral wall plane being oriented at an obtuse angle to the axis of the body member, as measured interiorly from the body member axis toward the rib lateral wall plane.

8. The filter assembly of claim 7 wherein the body member first and second ends have respective first and second cavities opening outwardly from the respective ends, the first and second cavities being in fluid communication with the respective first and second orifice outlets, and wherein the filtration material abuts the first and second body member ends, thereby forming first and second fluid pockets from the respective first and second body member end cavities, said first and second cavities in fluid communication with the orifice.

9. The filter assembly of claim 2 wherein the housing has a longitudinal axis intersecting the housing first and second base ends, the orifice is generally cylindrical having a longitudinal axis, and the orifice longitudinal axis is coaxial with the housing longitudinal axis.

10. The filter assembly of claim 2 wherein the housing has a longitudinal axis intersecting the housing first and second base ends, the orifice is generally cylindrical having a longitudinal axis, the flow channels are generally cylindrical having longitudinal axes coaxial with the orifice longitudinal axis, and the body member axis coaxial with the orifice longitudinal axis.

11. The filter assembly of claim 1 wherein the metal housing includes an inwardly turned flange at one end, and wherein the overmold extends over the flange to encapsulate a portion of the metal housing.

12. The filter assembly of claim 11 wherein the body member and housing cooperate to provide a cavity therebetween and the overmold substantially fills the cavity.

13. The filter assembly of claim 12 wherein the body member includes first and second planar ends generally perpendicular to the body member axis.

14. The filter assembly of claim 12 wherein the body member includes first and second ends and at least two positioning ribs with at least one positioning rib having a lateral wall generally defining a plane, the rib lateral wall plane being oriented at an acute angle to the axis of the body member, as measured interiorly from the body member axis toward the rib lateral wall plane.

15. The filter assembly of claim 12 wherein the body member includes first and second ends and at least two positioning ribs with at least one positioning rib having a lateral wall generally defining a plane, the rib lateral wall plane being oriented at an obtuse angle to the axis of the body member, as measured interiorly from the body member axis toward the rib lateral wall plane.

16. The filter assembly of claim 12 wherein the housing has a longitudinal axis intersecting the housing first and second base ends, the orifice is generally cylindrical having a longitudinal axis, and the orifice longitudinal axis is coaxial with the housing longitudinal axis.

17. The filter assembly of claim 12 wherein the housing has a longitudinal axis intersecting the housing first and second base ends, the orifice is generally cylindrical having a longitudinal axis, the flow channels are generally cylindrical having longitudinal axes coaxial with the orifice longitudinal axis, and the body member axis coaxial with the orifice longitudinal axis.

18. A filter assembly for filtering contaminants comprising:
a) a generally cylindrical metal housing having a first base end, second base end, and a generally hollow interior,
b) a generally cylindrical plastic body member having an axis and a plurality of radial positioning ribs received within the housing interior, the body member having an orifice extending therethrough with first and second outlets at respective terminal ends of the orifice, and the positioning ribs and housing cooperating to provide cavities between the housing and body member, c) filtration material with said body member therebetween, said filtration material thereby overlying and in fluid communication with each respective orifice outlet, d) a plastic overmold extending into the interior of the housing and having an outboard first flow channel therethrough directing fluid from outside the filter assembly to fluidly communicate with the filtration material overlying the first orifice outlet and an outboard second flow channel therethrough directing fluid from outside the filter assembly to fluidly communicate with the filtration material overlying the second orifice outlet, with a portion of the overmold adjacent the first housing base end further extending about the outer periphery of the first base end, the overmold further extending into the cavities between the positioning ribs of the body member.

19. The filter assembly of claim 18 wherein the overmold substantially fills at least one of the cavities between adjacent positioning ribs.

20. The filter assembly of claim 19 wherein the body member includes planar first and second ends generally perpendicular to the body member axis and two positioning ribs, with at least one positioning rib having a lateral wall generally coplanar with a respective end of the body member and a radial longitudinal wall with an arcuate longitudinal wall portion.

21. The filter assembly of claim 20 wherein the body member first and second ends have respective first and second end cavities opening outwardly from respective ends, the first and second end cavities being in fluid communication with the respective first and second orifice outlets, and wherein the filtration material abuts the first and second ends, thereby forming first and second fluid pockets in the filter assembly from the respective first and second body member end cavities, said first and second pockets for fluid communication with the orifice.

22. The filter assembly of claim 19 wherein the body member includes first and second ends and at least two positioning ribs with at least one positioning rib having a lateral wall generally defining a plane, the rib lateral wall plane being oriented at an acute angle to the axis of the body member, as measured interiorly from the body member axis toward the rib lateral wall plane.

23. The filter assembly of claim 22 wherein the body member first and second ends have respective first and second end cavities opening outwardly from the respective ends, the first and second end cavities in fluid communication with the respective first and second orifice outlets, and wherein the filtration material abuts the first and second ends, thereby forming first and second fluid pockets in the filter assembly from the respective first and second body member end cavities, said first and second pockets for fluid communication with the orifice.

24. The filter assembly of claim 19 wherein the body member includes first and second ends and at least two positioning ribs with at least one positioning rib having a lateral wall generally defining a plane, the rib lateral wall plane being oriented at an obtuse angle to the axis of the body member, as measured interiorly from the body member axis toward the rib lateral wall plane.

25. The filter assembly of claim 24 wherein the body member first and second ends have respective first and second end cavities opening outwardly from the respective ends, the first and second end cavities in fluid communication with the respective first and second orifice outlets, and wherein the filtration material abuts the first and second ends, thereby forming first and second fluid pockets in the filter assembly from the respective first and second body member end cavities, said first and second pockets for fluid communication with the orifice.

26. The filter assembly of claim 19 wherein the housing first end includes a flange extending inwardly toward the body member axis.

27. The filter assembly of claim 19 wherein the housing has a longitudinal axis intersecting the housing first and second base ends, the orifice is generally cylindrical having a longitudinal axis, the flow channels are generally cylindrical having longitudinal axes coaxial with the orifice longitudinal axis, and the body member axis coaxial with the orifice longitudinal axis.

* * * * *